United States Patent
George-Svahn et al.

(10) Patent No.: US 11,699,439 B2
(45) Date of Patent: Jul. 11, 2023

(54) DIGITAL ASSISTANT AND A CORRESPONDING METHOD FOR VOICE-BASED INTERACTIVE COMMUNICATION BASED ON DETECTED USER GAZE INDICATING ATTENTION

(71) Applicant: Tobii AB, Danderyd (SE)

(72) Inventors: Erland George-Svahn, Danderyd (SE); Sourabh Pateriya, Danderyd (SE); Onur Kurt, Danderyd (SE); Deepak Akkil, Danderyd (SE)

(73) Assignee: Tobii AB, Danderyd (SE)

( * ) Notice: Subject to any disclaimer, the term of this patent is extended or adjusted under 35 U.S.C. 154(b) by 93 days.

(21) Appl. No.: 17/129,188

(22) Filed: Dec. 21, 2020

(65) Prior Publication Data
US 2021/0256980 A1 Aug. 19, 2021

(30) Foreign Application Priority Data

Dec. 20, 2019 (SE) .................................... 1951518-8

(51) Int. Cl.
*G10L 15/22* (2006.01)
*G10L 17/06* (2013.01)
(Continued)

(52) U.S. Cl.
CPC .............. *G10L 15/22* (2013.01); *G06V 40/10* (2022.01); *G06V 40/174* (2022.01); *G06V 40/19* (2022.01);
(Continued)

(58) Field of Classification Search
CPC ......... G10L 13/00; G10L 14/00; G10L 14/22; G10L 14/24; G10L 14/25; G10L 17/00;
(Continued)

(56) References Cited

U.S. PATENT DOCUMENTS

| 5,859,642 | A | * | 1/1999 | Jones | ...................... G06F 3/011 715/854 |
| 10,713,002 | B1 | * | 7/2020 | Alameh | ............... H04R 29/001 |

(Continued)

OTHER PUBLICATIONS

Swedish Search Report and Written Opinion of 1951518-8, dated Nov. 9, 2020.

*Primary Examiner* — Shaun Roberts
(74) *Attorney, Agent, or Firm* — Noréns Patentbyrå AB

(57) ABSTRACT

Method for voice-based interactive communication using a digital assistant, wherein the method comprises,
an attention detection step, in which the digital assistant detects a user attention and as a result is set into a listening mode;
a speaker detection step, in which the digital assistant detects the user as a current speaker;
a speech sound detection step, in which the digital assistant detects and records speech uttered by the current speaker, which speech sound detection step further comprises a lip movement detection step, in which the digital assistant detects a lip movement of the current speaker;
a speech analysis step, in which the digital assistant parses said recorded speech and extracts speech-based verbal informational content from said recorded speech; and
a subsequent response step, in which the digital assistant provides feed-back to the user based on said recorded speech.

18 Claims, 4 Drawing Sheets

(51) Int. Cl.
*G10L 17/24* (2013.01)
*G10L 25/78* (2013.01)
*G06V 40/10* (2022.01)
*G06V 40/19* (2022.01)
*G06V 40/16* (2022.01)

(52) U.S. Cl.
CPC .............. *G10L 17/06* (2013.01); *G10L 17/24* (2013.01); *G10L 25/78* (2013.01); *G10L 2015/226* (2013.01)

(58) Field of Classification Search
CPC ......... G10L 17/06; G10L 17/20; G10L 17/22; G10L 17/24; G10L 25/78; G10L 25/783; G10L 25/84; G10L 25/93; G06V 40/00; G06V 40/10; G06V 40/16; G06V 40/174; G06V 40/175; G06V 40/176; G06V 40/18; G06V 40/19; G06V 40/20
See application file for complete search history.

(56) References Cited

U.S. PATENT DOCUMENTS

| | | |
|---|---|---|
| 2013/0021459 A1 | 1/2013 | Vasilieff |
| 2014/0004485 A1* | 1/2014 | Younkin ................. G09B 19/00 434/127 |
| 2014/0028826 A1 | 1/2014 | Lee et al. |
| 2016/0018985 A1* | 1/2016 | Bennet ................... G09G 3/002 345/175 |
| 2016/0093113 A1* | 3/2016 | Liu ...................... G06F 3/04845 345/156 |
| 2018/0268812 A1* | 9/2018 | Kim ........................ G10L 15/25 |
| 2018/0300557 A1* | 10/2018 | Rodenas .......... G08B 13/19613 |
| 2020/0227034 A1* | 7/2020 | Summa ................... G10L 15/22 |
| 2020/0341546 A1* | 10/2020 | Yuan ...................... G06F 3/0304 |
| 2020/0349966 A1* | 11/2020 | Konzelmann .......... G06V 40/18 |
| 2021/0224031 A1* | 7/2021 | Nair ........................ G10L 15/22 |

\* cited by examiner

DIGITAL ASSISTANT AND A CORRESPONDING METHOD FOR VOICE-BASED INTERACTIVE COMMUNICATION BASED ON DETECTED USER GAZE INDICATING ATTENTION

CROSS-REFERENCE TO RELATED APPLICATION

The present application claims benefit to Swedish patent application No. 1951518-8, filed Dec. 20, 2019, entitled "Improved turn-taking", and is hereby incorporated by reference in its entirety.

TECHNICAL FIELD

The present invention relates to a method for improved turn-taking when a user interacts using voice with a digital assistant. The invention also relates to a system and a computer software product.

BACKGROUND OF THE INVENTION

Users can interact with different types of digital assistants in many different situations. Such interaction, in the context of the present invention, takes place at least partly using the voice channel. A digital assistant will typically capture the sounds of phrases uttered by a user; parse and interpret the captured sounds; process the informational contents of said phrases; and provide a response to the user. The response may be delivered using the voice channel or in any other suitable way, such as by the activation of a particular device.

For instance, interactive speakers may be used in home settings to query the weather or cooking recipes. Other examples include users requesting lighting to be dimmed or lit; music to play and so forth.

Digital assistants may also be provided as integrated parts of larger devices, such as providing particular services to a user of a computer, for instance by arranging a digital assistant having a secondary display of the computer used to interactively perform specific tasks when gaming or working.

Digital assistants may also be used in various implementations within manufacturing or other specialized industry settings, such as an operator interacting with a machine or system.

The principles disclosed herein are also applicable to virtual digital assistants, such as used in AR/VR applications.

In general, there are several problems with conventional such digital assistants.

Firstly, it is difficult to accurately detect when a user requests the attention of a digital assistant, and when a phrase actually uttered toward the digital assistant (100;200) begins. Many digital assistants use predetermined catch-phrases, such as "OK, COMPUTER". This may be perceived as awkward by users. Even using such catch-phrases, it may be difficult for a digital assistant to know when a user actually is requesting attention.

Secondly, it is difficult to detect an end point of such an uttered phrase.

Thirdly, it is difficult to distinguish a phrase uttered by a first user from other sounds, in particular phrases uttered by other users.

Fourthly, it is difficult to reliably keep the context of a particular interaction with a particular user between phrases. Many times, a second or following phrase may refer to a first phrase, adding to interaction complexity.

Fifthly, it is desirable to be able to provide a user experience with is adaptive in the sense that the digital assistant (100;200) adapts its behaviour to the particular situation in which the interaction takes place.

WO 2018169568 A1 discloses a digital assistant using lip movement detection to detect a start point and an end point of an uttered phrase. This is done by temporally correlating captured images determined typical for speech lip movement to detected speech sound; and also by correlating particular detected lip movements to particular detected sounds.

The present invention at least partly solves these problems.

SUMMARY OF INVENTION

Hence, the invention relates to a method for voice-based interactive communication using a digital assistant, wherein the method comprises an attention detection step, in which the digital assistant detects a user attention and as a result is set into a listening mode; a speaker detection step, in which the digital assistant detects the user as a current speaker; a speech sound detection step, in which the digital assistant detects and records speech uttered by the current speaker, which speech sound detection step further comprises a lip movement detection step, in which the digital assistant detects a lip movement of the current speaker; a speech analysis step, in which the digital assistant parses said recorded speech and extracts speech-based verbal informational content from said recorded speech; and a subsequent response step, in which the digital assistant provides feedback to the user based on said recorded speech.

Furthermore, the invention relates to a digital assistant arranged for voice-based interactive communication, wherein the digital assistant is arranged to detect a user attention and as a result be set into a listening mode; detect the user as a current speaker; detect and record speech uttered by said current speaker; detect a lip movement of the current speaker while detecting said speech; parse said recorded speech and extract speech-based verbal informational content from said recorded speech; and thereafter provide feedback to the user based on said recorded speech.

Moreover, the invention relates to a computer software product arranged to, when executed on one or several CPUs, cause a digital assistant to perform the following steps to provide voice-based interactive communication: an attention detection step, in which the digital assistant is caused to detect a user attention and as a result is set into a listening mode; a speaker detection step, in which the digital assistant is caused to detect the user as a current speaker; a speech sound detection step, in which the digital assistant is caused to detect and to record speech uttered by said current speaker, which speech sound detection step comprises a lip movement detection step, in which the digital assistant is caused to detect a lip movement of the current speaker; a speech analysis step, in which the digital assistant is caused to parse said recorded speech and to extract speech-based verbal informational content from said recorded speech; and a subsequent response step, in which the digital assistant is caused to provide feedback to the user based on said recorded speech.

In the following, the invention will be described in detail, with reference to exemplifying embodiments of the invention and to the enclosed drawings, wherein:

BRIEF DESCRIPTION OF DRAWINGS

In FIGS. 1 and 2, reference numerals share the last two digits for corresponding parts.

DETAILED DESCRIPTION

Figure 1:
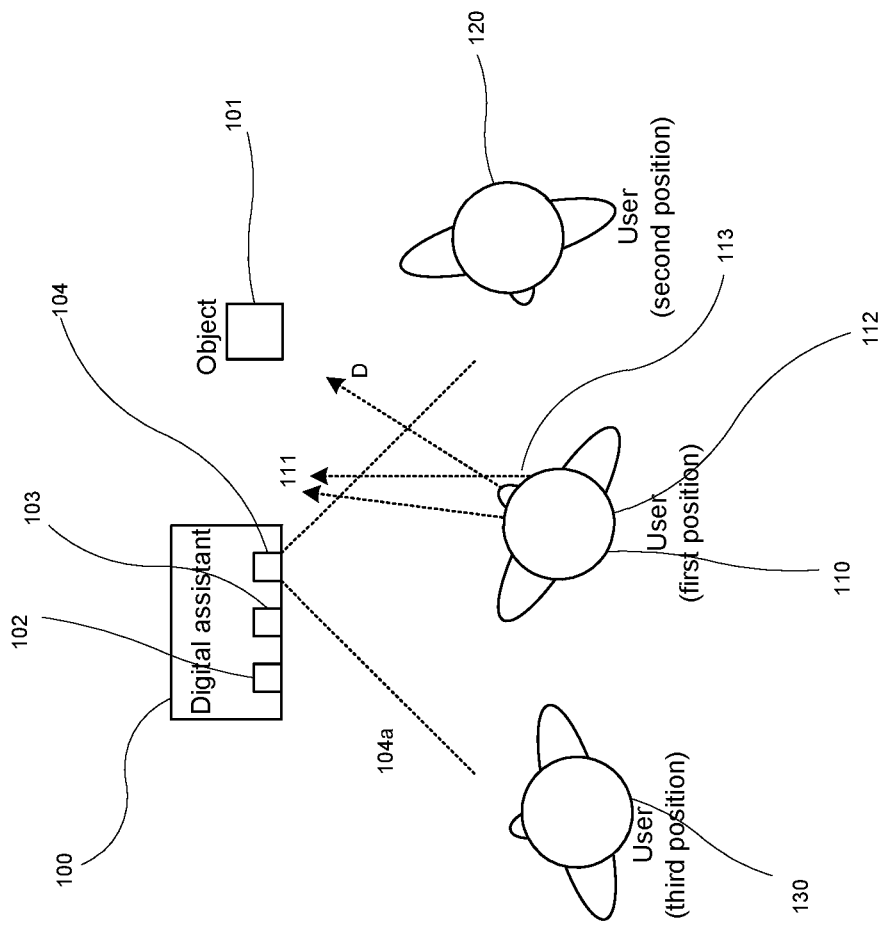
FIG. 1 is an overview of a system according to a first exemplary embodiment the present invention, arranged to perform a method according to the present invention.
Figure 2:
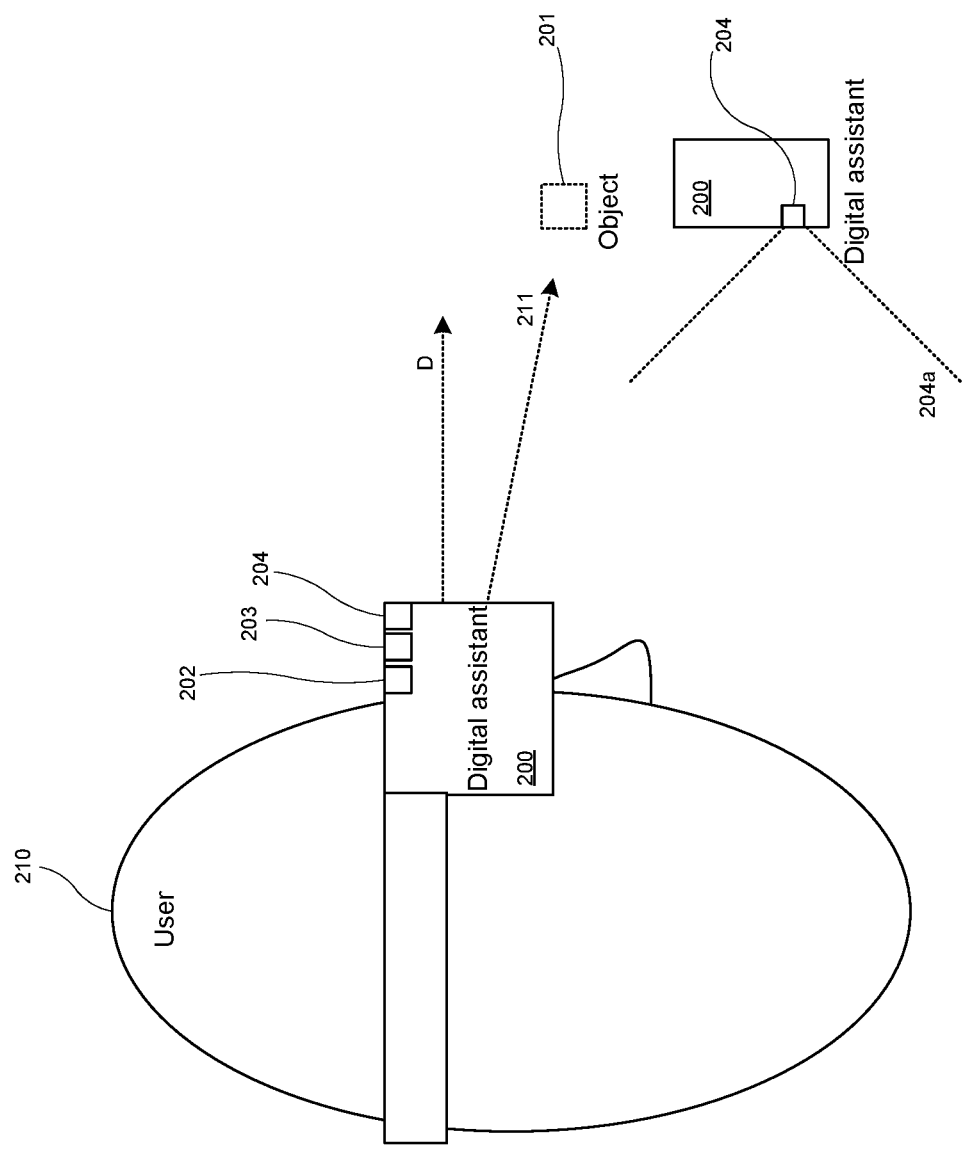
FIG. 2 is an overview of a system according to a second exemplary embodiment the present invention, also arranged to perform a method according to the present invention.
Figure 4:
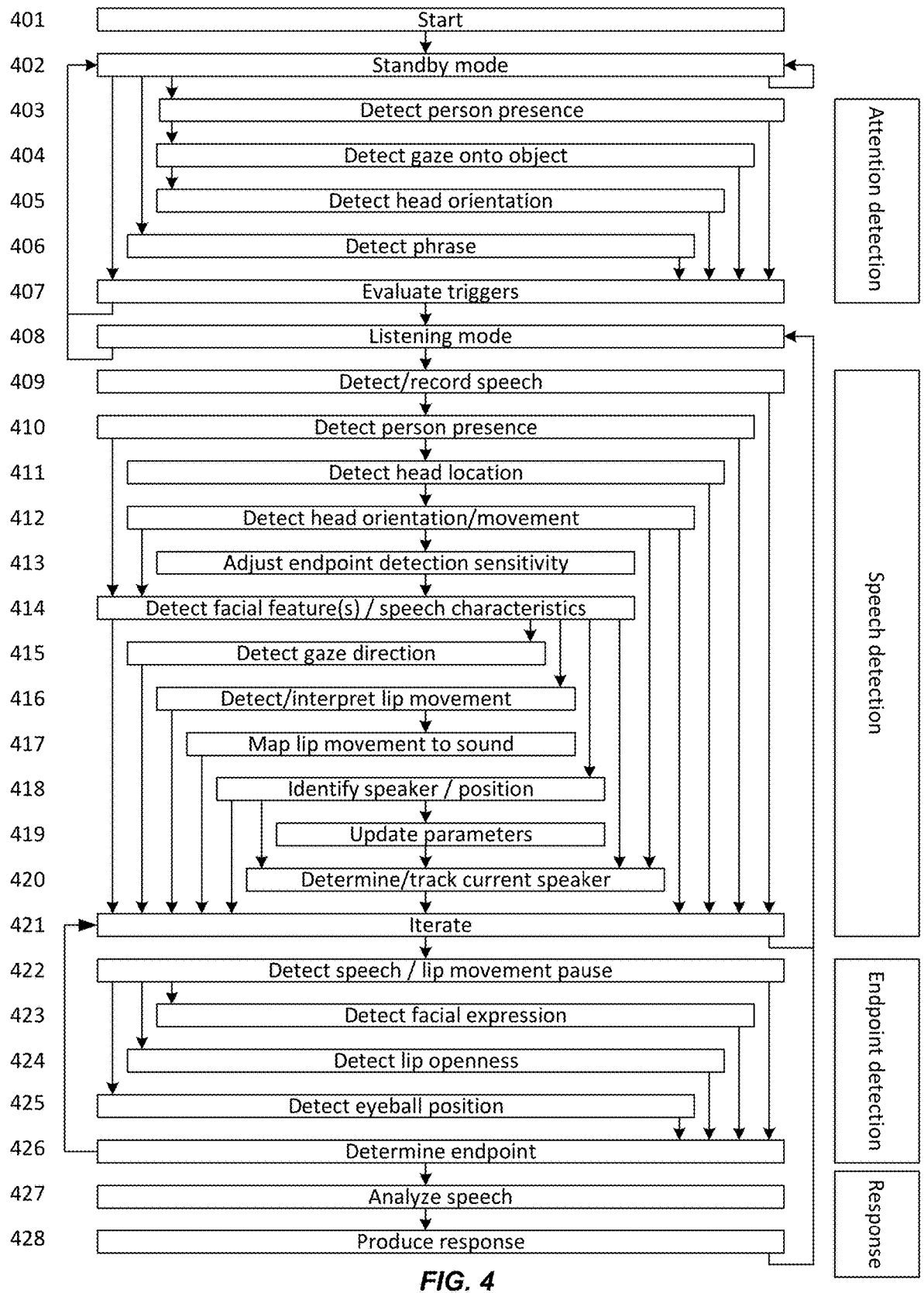
FIG. 4 is a flowchart illustrating various methods according to the present invention.

Hence, FIG. 1 illustrates an example of a system 100 according to the invention, being arranged to perform a method according to the present invention. FIG. 2 illustrates another such example of a system 200. Such a method is illustrated in FIG. 4 in a flowchart.

The present method and system 100, 200 are for providing voice-based interactive communication using a digital assistant 100, 200.

As used herein, the term "digital assistant" is to be understood broadly, as any physical, digital and/or virtual entity being arranged to communicate via voice (sound, in particular speech) with a human user, and further particularly in an interactive manner. In preferred embodiments, the digital assistant is at least partly embodied as a physical entity, at least such a physical entity comprising one or several sensors detecting physical users.

That communication is "interactive" means that the communication is a two-way dialog, in which both the user and the digital assistant provides information to the other party at least once. In its broadest sense, the user will hence provide information to the digital assistant 100, 200 by uttering speech one or several times, and the digital assistant 100, 200 will provide information to the user one or several times. Preferably, the user and the digital assistant 100, 200 take turns to provide such information, in a way corresponding to a human-to-human verbal dialog. It is preferred that the digital assistant 100, 200 provides information using sound, such as by the use of digital speech synthesis. However, the information provided by the digital assistant 100, 200 may of any type, such as in the form of written text or other information on a display screen; by any physical actor being automatically activated in any suitable way; or any other type of information-carrying channel recognisable by the user. In many practical use cases, the information provided by the digital assistant 100, 200 to the user will constitute feedback determined based on information previously provided from the user to the digital assistant 100, 200.

The digital assistant 100 may be equipped with various sensors, for detecting physical properties of a local surrounding of the digital assistant 100, and in particular of one or several users or potential users 110, 120, 130. Such sensors may include, by way of example, one or several of a sound sensor 102, a proximity sensor 103 and an image sensor 104. Other examples of possible sensors are radar, lidar and thermal sensors. The image sensor 104 may be arranged to digitally depict an area 104a in front of the image sensor 104. Each such sensor may be conventional as such, and will not be described in detail herein.

The image sensor 104 may comprise or form part of a per se conventional gaze detection device, such as a digital camera-based gaze detection device. Such gaze detection devices are generally known in the art, such as in U.S. Pat. No. 6,152,563, and will not be described more in detail here. In general, however, such a gaze detection device will measure a three-dimensional gaze direction and/or gaze point in relation to the user and the sensor 104.

The digital assistant 100 may also comprise or be associated with (such as having knowledge of the geometrical positioning of) a predetermined object 101, such as a physical entity. The object 101 may be any type of object arranged to act as an attention focus for a user 110 in connection to communicating with the digital assistant 100. For instance, the object 101 may be a piece of hardware belonging to digital assistant 100 itself, such as could be the case if the digital assistant 100 is a "smart speaker" type of device and the object 101 is the speaker itself or a part thereof; or the object 101 may be any clearly defined item, area or part which has been predetermined to act as such an attention focus, arranged anywhere in the local presence of the digital assistant 100 and the user 110. For instance, the object 101 may be a particular part of a physical computer equipped with a digital assistant 100 software as described below; or a red dot provided to the user separately for arrangement in a convenient location in connection to the digital assistant 100.

FIG. 2 illustrates another example, in which the object 201 is a virtual object in a virtual scene viewed by the user 210 via a set of 3D glasses being or comprising the digital assistant 200. In this case, the digital assistant may comprise a sound sensor 202 for detecting speech uttered by the user 210; a head movement sensor 203 arranged to detect a head movement and/or position of the user 210 (may comprise standard accelerometer and/or gyro hardware, such as a MEMS circuit); a gaze detection sensor 204 of known type, such as a digital camera based gaze sensor; and so forth.

The digital assistant 200 in FIG. 2 may also comprise a physical user 110 viewing device, in turn comprising a digital image sensor 204 arranged to depict an area 204a in front of the device 200. This image sensor 204 may be used for detecting lip movement of the user 210. However, it is realized that such lip movement may alternatively be detected by a sensor provided as a part of said 3D glasses.

It is noted that the 3D glasses shown in FIG. 2 is merely one of several available examples of equipment designed to provide an immersive/non-immersive virtual/augmented reality experience, and that the principles described herein, as applicable, are equally valid for other types of such equipment and with various types of physical and/or virtual digital assistants used in such user experiences.

In FIGS. 1 and 2, D denotes a direction in which the user's 110, 210 head is currently directed, while 111, 211 denotes a direction in which the gaze of the user 110, 210 is currently directed and which is measured by sensor 104, 204.

FIG. 4 illustrates a method according to the present invention.

In a first step 401, the method starts.

In a subsequent step 402, the digital assistant 100, 200 is in a standby mode. This means that one or several sensors of the digital assistant 100, 200 may be activated for detecting the attention of a user 110, 120, 130; 210, but that the digital assistant 100, 200 is not actively involved in an interaction with a particular user. After a finalised interactive communication session of the type described herein, the digital assistant 100, 200 will typically return to this standby mode step 402.

In a subsequent part of the method, namely an attention detection step 403-407, the digital assistant 100, 200 detects the attention of a particular user 110, 210, and as a result is set into a listening mode, in step 408.

The method further comprises a speaker detection step, which may be a part of said attention detection step 403-406 and/or of a subsequent speech detection step of the below described type. In this speaker detection step, the digital assistant 100, 200 detects the user 110, 210 as a current speaker. Such a detected current speaker may be one particular user 110 out of several present users 110, 120, 130, which one user 110 is detected as the user currently speaking; the user about to speak; or at least the user to be used as the current speaker for the purposes of the present method in the interactive communication to be performed. This detection can be made in several different ways, as will be described in further detail below.

In a part of the method performed after said attention detection step 403-407, namely a speech detection step 409-421, the digital assistant 100, 200 detects and records speech uttered by said detected current speaker. This detection and recording of sound may be performed using sensor 102, 202.

This speech detection step 409-421 further comprises a lip movement detection step 416, in which the digital assistant 100, 200 detects a lip movement of said detected current speaker. Typically, this lip movement will be detected via image data captured by the above described sensors 104, 204, but may in practise be detected in any suitable way allowing the digital assistant 100, 200 to detect lip movement of the current speaker to reliably be able to, via digital data analysis, determine lip movement patterns or discreet lip movements being characteristic of different uttered speech sounds.

In a speech analysis step 427, which may be performed after a speech endpoint has been detected (see below) and/or even as the user 110 still speaks (FIG. 4 is simplified and only shows such analysis being performed after a detected endpoint), the digital assistant 100, 200 parses the recorded speech sounds and extracts speech-based verbal informational content from the recorded speech. Such automatic parsing of speech based on digitally stored speech sound data is conventional as such, and will not be described in detail herein. Conventionally, however, such parsing uses statistical and/or algorithmic methods, for instance a trained neural network and/or rule-based software algorithms, to parse speech sounds into corresponding verbal content such as digitally stored written language information.

Herein, the term "speech-based verbal informational content" means the informational language content as determined based on detected and automatically interpreted speech sound.

The speech analysis step 427 will typically also comprise an information analysis sub step, in which informational content of the verbal informational content is assessed. For instance, the digital assistant 100, 200 may determine if the speech uttered by the user 110, 210 is a question or another type of statement; it may further detect certain words to be used for information searching in an indexed database; it may assess a particular topic of focus for the analysed speech to be used as a constraint when producing user feedback; and so forth.

In a subsequent response step 428, the digital assistant 100, 200 provides feedback to the user 110, 210 based on said recorded speech, and in particular based on said parsed and analysed verbal content.

Since lip movement of a detected current speaker (the user 110, 210 in the above illustrative example) is identified, and since the current speaker is detected as a user 110, 210 which is currently speaking, it is possible to use the detected lip movement to validate recorded speech sounds against such lip movement detected in relation to the user 110, 210 who is actually currently speaking. This generally provides a more reliable listening by the digital assistant 100, 200, in turn being useful for producing a feedback response of generally higher quality and reliability.

In a very preferred embodiment, the method further comprises a current speaker tracking step 420, in which the digital assistant 100, 200 tracks the current speaker using visual and/or voice tracking of the current speaker.

Visual tracking of the current speaker may be performed based on facial features of the current speaker detected in a step 418 given information regarding a current head location (in relation to the image sensor) and orientation of the current speaker detected in steps 411 and 412, respectively. Detected facial features, or even only the head location of the current speaker, may be used to visually track the current speaker through space. Such visual tracking may employ per se conventional object tracking tools that are conventional in the field of digital video processing, operating under the assumption of continuous movement through space of objects. Useful facial features comprise, for instance, the ears, nose, eyes and mouth of the depicted user.

Voice tracking of the current speaker may be performed based on speech characteristics of the current speaker identified in step 418, using speech sounds detected/recorded in step 409 (the same speech sounds that are later analysed in step 427). For instance, a tonality, a phrasing pattern, a speaking tempo, the occurrence of particular language sounds, a general speech pattern, and so forth, may be used to uniquely characterise the speech provided by the current speaker.

Using such visual and/or voice tracking of the current speaker, the digital assistant 100, 200 can continuously keep track of the current speaker over time, to make sure that it is the same user 110, 120, 130; 210 that speaks, and so that the detected speech will be detected as a single, continuous stream of verbal information.

It is noted that, in the example of FIG. 2, there may be several simultaneous users (only one shown in FIG. 2 for reasons of simplicity), each with a 3D headset. The digital assistant 200 may serve several such simultaneous users and may keep track of the current speaker using voice tracking, for instance.

It is also noted that the digital assistant may ignore speech sounds recorded that can be determined to not originate from the current speaker, on the basis that such recorded speech sounds do not match said detected speech characteristics and/or based on lip synchronisation.

Namely, the method may further comprise a lip movement synchronisation step 417, in which the digital assistant 100, 200 temporally correlates lip movement detected in step 416 to speech sound detected in step 409. Such temporal correlation may be with respect to sound/lip patterns using a trained network or similar, and/or be based on a rule-based statistical algorithm mapping certain predetermined speech sounds to certain predetermined lip movements. Both the correlation with respect to timing of detected information and a correlation of sound corresponding lip movement may be performed within predetermined tolerance limits so as to be able to determine whether the detected lip movements probably (within statistical limits) correspond to the detected speech sound or not.

Moreover, in such a lip movement synchronisation step 417, particular detected discreet lip movements may temporally correlated to particular detected discreet speech sounds.

Furthermore, the method may further comprise a lip movement interpretation step 416, in which the digital assistant 100, 200 interprets a lip-based verbal informational content corresponding to said detected lip movement.

Herein, the term "lip based verbal informational content" means the informational language content as determined based on detected and automatically interpreted lip movement.

Then, said lip movement synchronisation step 417 may comprise the digital assistant 100, 200 temporally correlating the above mentioned determined speech-based verbal informational content to said lip-based verbal informational content. Furthermore, the analysis step 427 may comprise a speech parsing sub step, in which the digital assistant 100, 200 uses said lip-based verbal informational content to parse said speech-based verbal informational content.

For instance, available and time-synchronised lip-based verbal informational content may be used, in a statistical, rule-based and/or machine learning step to improve the precision of an automatic interpretation of said speech-based verbal informational content. Such tools are conventional as such, and will not be described in detail herein.

However, an alternative or additional example of such speech parsing using detected lip movement is the following. The speech parsing sub step may comprise the digital assistant 100, 200 purging at least part of the detected speech sound and/or at least part of extracted speech-based verbal informational content that does not, within predetermined static or functionally defined statistical limits, correspond to detected lip movement. Such non-corresponding detected speech sound may originate from other users than the detected current speaker, and may therefore be disregarded by the digital assistant 100, 200.

It may even be so that the present method comprises providing to the digital assistant 100, 200 a predetermined attention phrase, in a phrase detection step 406 being part of the above mentioned attention detection step. Such a catch phrase may be any predetermined phrase designed to catch the attention of the digital assistant, such as the phrase "OK, ASSISTANT" or any other suitable phrase or sound. Then, said speech parsing sub step may comprise the digital assistant 100, 200 actually purging extracted speech-based verbal information content starting with said attention phrase but uttered by a different person than the current speaker. In other words, in case a predetermined catch phrase is detected, this phrase and any associated speech sounds following the catch phrase is disregarded by the digital assistant 100, 200 in case these speech sounds do not match the detected lip movement of the current speaker. As a result, as long as the current speaker is still speaking (the digital assistant 100, 200 has still not detected an endpoint of the speech by the current speaker) another user cannot attract the attention of the digital assistant 100, 200 even if the other user utters a predetermined catch phrase in fact being designed to attract the attention of the digital assistant 100, 200.

As mentioned above, the current speaker detection can be performed in several ways. In some embodiments, said speaker detection step 420 comprises temporally correlating detected lip movements of the user 110, 210 to detected speech sounds, and identifying the user 110, 210 as the current speaker based on said temporal correlation. For instance, the digital assistant 100, 200 may measure speech characteristics of the user 110, 210 during the above mentioned speech detection, and define the current speaker as the user having these speech characteristics; or the digital assistant 100, 200 may be provided by a priori knowledge of speech characteristics of a number of users 110, 120, 130; 210 and determine, based on said recorded speech sounds and said saved speech characteristics, that the recorded speech sounds originate from a particular one of said users 110, 120, 130; 210.

Furthermore, the speaker detection step 420 may also comprise a speaker identification step 418, wherein the user 110, 210 is not only detected as the current speaker but is also identified as a particular user. Such identification may comprise a visual user 110, 210 authentication step, in which, for instance, facial features or characteristics detected in step 414 are used to map the depicted user to a database of known users 110, 120, 130; 210 and to determine, to predetermined statistical precision, the identity of the current speaker. Such authentication may also comprise a voice sound characteristics based user 110, 210 authentication step, in which the recorded speech sound is characterised and mapped to a database of known users so as to determine the identity of the current speaker. Tools for such user identification/authentication based on visual images and/or recorded speech sounds are conventional as such, and will not be described in detail herein.

In particular, such a user database may be comprised in or available to the digital assistant. Furthermore, such a user database may comprise one or several user interaction parameters for the identified current speaker. For instance, such interaction parameters may comprise information regarding a speech or hearing impairment of the user; personal user preferences such as particular topics of interest or predetermined external informational services to be used by the digital assistant when interacting with that particular user; and so forth. Then, the method may further comprise selecting a set of one or several such user interaction parameters, or updating them, in a step 419, based on an identity identified in said speaker identification step, and using the selected parameter values to provide a bespoke user experience during the interaction with the current speaker in question. Since such an identification can be fully automatic and dynamic in the sense that different current speakers are identified on the fly, this provides for a very flexible yet precise user experience without need for manual intervention.

In preferred embodiments, the method is iterative, in the sense that speech uttered by the user 110, 210 in her capacity as the current speaker are responded to, in some meaningful way, by the digital assistant 100, 200, which response is again responded to, or followed up by, the same user 110, 210 in a follow-up statement or query to the digital assistant 100, 200, that again provides feedback, and so on. Preferably, the digital assistant 100, 200 during such iterative dialogue keeps an information context which is specific to the iterative dialog in question. For instance, the digital assistant 100, 200 can remember a first question asked by the user 110, 210 and assume that a second question uttered by the user 110, 210, after being provided with feedback by the digital assistant 100, 200, is a question assuming the first question and/or the feedback in question. Then, such context can be used in the determination by the digital assistant 100, 200 of a suitable response to the follow-up phrase from the user 110, 210.

Hence, the method may iterate back, such as from the response step 428 after having provided a feedback to the current speaker back to a listening mode 408, being prepared to detect additional speech sounds from the current speaker. This speech detection is then part of a subsequent follow-up interaction step, in which additional speech is detected and analysed and in which the digital assistant 100, 200 provides feedback to the user 110, 210 based on such detected additional speech. In this and other iterative dialogue scenarios, in said follow-up interaction step, the digital assistant 100, 200 maintains the identification of the current speaker. This may imply that the digital assistant 100, 200 maintains an active visual and/or voice-based tracking of the current speaker, and/or that the digital assistant 100, 200 keeps a currently active definition, in terms of facial and/or voice characteristics, of the active speaker, as has been described above. In other words, once the same active speaker utters additional speech, the digital assistant 100, 200 will know that the speech is uttered by the same active speaker as the previous speech, and can as a result keep said context and put it to relevant use.

A particular type of iterative dialogue involves facial expressions of the current speaker, that may be detected in a step 423 as a part of an endpoint detection series of steps, or in step 414 in turn based on a detected head location (step 411) and/or orientation (step 412). In general, the facial expression of the current speaker can be detected using a visual depiction of the current speaker and image analysis, using standard image analysis tools as described above. For instance, the output of such detection may be "surprised" or "contemplating". Once a facial expression has been detected, it may be used in a follow-up interaction step of said type, whereby a follow-up feedback provided to the current speaker by the digital assistant 100, 200 is determined based in part on the detected facial expression. For instance, in case the digital assistant 100, 200 provides a response to a first question posed by the current speaker, and the current speaker in response thereto puts on a sceptic face, the digital assistant 100, 200 may respond to this facial expression (interpreted as a next user speech in the iterative dialogue) by an explanatory or detailing further piece of information provided to the current speaker.

As is further illustrated in FIG. 4, the above mentioned attention detection step generally comprises steps 403-407. In some embodiments, this attention detection step further comprises a gaze detection step 404, in which the digital assistant 100, 200 detects a current gaze 111, 211 of the user 110, 210. Then, the digital assistant 100, 200 uses such detection as a necessary condition, for determining that the attention of a user 110, 210 has been detected, that the detected gaze 111, 211 is directed towards the predetermined object 101, 201 within a predetermined gaze direction margin. Hence, directing the gaze to the predetermined object 101, 201 may be a way of making the digital assistant 100, 200 enter the listening mode in step 408, possibly using the gaze-detected user 110, 210 as the detected current speaker. As described above, such gaze detection may use per se conventional gaze detection equipment, that may be integrated into the digital assistant 100, 200.

Additionally or alternatively, said attention detection step may further comprise a head posture or orientation detection step 405, in which the digital assistant 100, 200 detects, such as using image analysis as described above, a current head posture of either of the present users 110, 120, 130; 210 and in turn detects a direction in which the face 113 of the user in question is turned. Then, the digital assistant 100, 200 uses, as a necessary condition for detecting said user 110, 120, 130; 210 attention, that it is determined that said face 113 of the user 110, 120, 130; 210 faces towards the predetermined object 101, 201 within a predetermined head posture margin. Hence, instead of or in addition to the gaze direction, the face direction may be used as a way of making the digital assistant skip to listening mode 408.

In a preferred embodiment, both gaze and face need to be directed to the same predetermined object 101, 201 for the user attention to be detected. In other words, the user needs to both look at the predetermined object 101, 201 and also face the predetermined object 101, 201, at the same time, to "wake" the digital assistant 100, 200 and have it listen to speech uttered by the user 110, 120, 130; 210 in question. In the case of the FIG. 2 embodiment, it is noted that the gaze direction and the face direction may in general be detected using different sensors. The face direction may, for instance, be detected using an accelerometer built into the 3D glasses mounted on the head of the user 210. In FIG. 1, both gaze and face direction may be detected using the same image detector but using different digital image analysis methods operating on the captured image of the user in question.

In some embodiments, when the method comprises step 406 in which a predetermined attention phrase of the above type is provided to the digital assistant 100, 200, the attention detection step may actually comprise the digital assistant 100, 200 detecting a user 110, 120, 130; 210 attention based on said gaze detection step 404 together with said head posture detection step 405, but in the absence of a detection of said predetermined attention phrase. So, the user 110, 120, 130; 210 may in this case activate the digital assistant 100, 200 by any one of uttering said predetermined attention phrase or directing gaze and face towards the predetermined object 101, 201.

Hence, the digital assistant 100, 200 may be triggered by different triggers, exemplified herein by the gaze and/or face directed onto the predetermined object 101, 102; the detection of speech sounds mappable to a particular user 110, 120, 130; 210 and/or a previously detected current speaker; and/or the utterance of a predetermined attention phrase. These triggers are evaluated in a step 407, and in case the evaluation is positive, attention is deemed to have been detected and the digital assistant 100, 200 enters listening mode in step 408.

As mentioned above, the method may furthermore comprise an endpoint detection step 422-426, performed after said speech sound detection step 409. In the endpoint detection step, the digital assistant 100, 200 detects an endpoint of said speech and as a result exits the listening mode. The digital assistant 100, 200 may be arranged to interpret this as an endpoint of a phrase, such as a statement or a question, uttered by the user 110, 120, 130; 210 in her capacity of the current speaker.

Such an endpoint detection step is illustrated in FIG. 4 as taking place after the speech detection step. However, the endpoint detection step may take place whenever a potential endpoint is to be detected, such as continuously and in parallel to the speech detection step; at regular intervals; or similar.

The endpoint detection may be based on a detected pause in the speech sound and/or lip movement of the current speaker, in a step 422, subject to a minimum pause time and/or a certain sensitivity algorithm in which also different factors (such as of the below described types) are weighed in to come to a definitive decision regarding if an endpoint can be detected or not.

In particular, the endpoint detection may be associated with an endpoint detection parameter, such as an endpoint detection sensitivity parameter, which may be dynamically changed or updated, in step 413, during the performance of the present method. Such an endpoint detection parameter is then used in the detection of said endpoint in step 426 of said endpoint detection step 422-426.

For instance, the above discussed speech analysis step may comprise the digital assistant 100, 200 detecting, in step 412, a current head posture and/or head posture change, and update an endpoint detection parameter of said type. Hence, such head posture and/or head posture change may be determined during the speech detection step, and subsequently used in the endpoint detection step for affecting when a speech endpoint is detected.

In a particular example, the speech analysis step further comprises the digital assistant 100, 200 detecting that the current speaker either is currently turning her face away from the predetermined object 101, 201 or has her face turned away from the predetermined object 101, 201 during at least a predetermined time period. Then, such turning away from the predetermined object 101, 201 and/or being turned away from the predetermined object 101, 201 may be interpreted as a speech endpoint in step 426.

It is particularly noted that such turning away (or being turned away) of the face of the current speaker, in relation to a predetermined attention object 101, 201 perceived by the user 110, 210 as the focus of attention when engaging in dialogue with the digital assistant 100, 200 is an efficient way of detecting diminishing user 110, 120, 130; 210 attention to the dialogue. In fact, it is preferred that the direction of the user's 110, 210 face rather than her gaze is used to determine speech endpoint; preferably the digital assistant 100, 200 is arranged to allow the user's 110, 210 gaze to wander freely without considering such wandering as such as being indicative of a speech endpoint as long as the face of the user 110, 210 is turned towards the predetermined object 101, 201.

The gaze direction may be monitored in a gaze direction detection step 415 performed during the speech detection step, and used for different purposes.

Moreover, the endpoint detection step 422-426 may further comprise a user depiction step, which may be of the same type as described above, performed by said image sensor and in which the face 113 of the user 110, 210, in her capacity as the current speaker, is depicted and stored as a digital image. Thereafter, the endpoint detection step may comprise a facial expression detection step 423, in which a facial expression of the user 110, 210 is detected based on a set of predetermined facial expression parameters. Moreover, detected facial expressions are defined, in terms of said facial expression parameters, to be indicative of the user 110, 210 not yet having finished speaking. Then, the endpoint detection in step 426 may be postponed as a result of detection of one of said particular facial expressions, despite no speech currently being detected. In other words, by assuming a facial expression indicating for instance thoughtfulness or another user 110, 210 feeling, making it reasonable to assume that the user 110, 210 will utter more speech before being finished with the current iteration, the user 110, 210 can indicate to the digital assistant 100, 200 that there is still no speech endpoint to detect.

Figure 3:
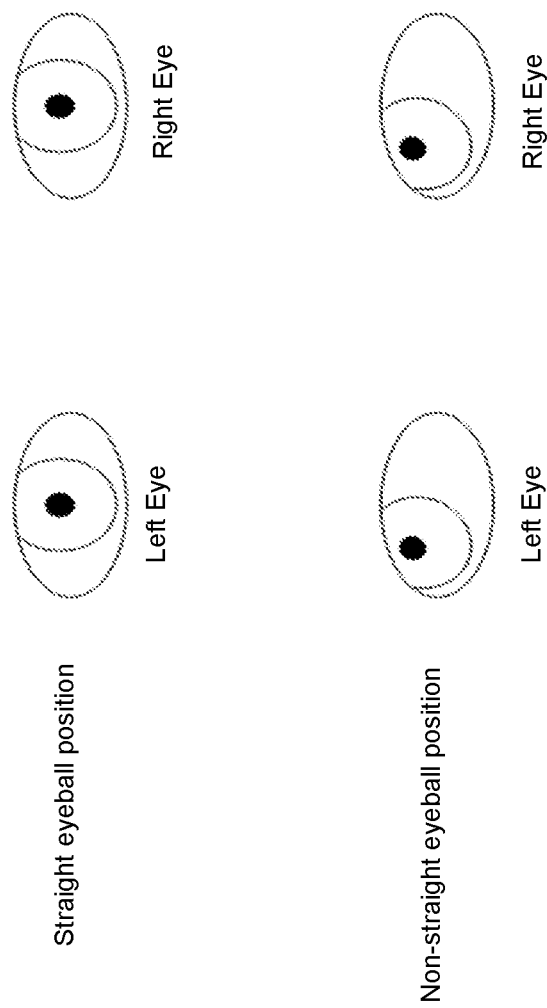
FIG. 3 is a detail view of the eyes of a user, in two different eyeball positions.

FIG. 3 illustrates a simple example of such a facial expression. In the upper part of FIG. 3, a pair of eyes is shown looking straight ahead. This could be defined, using appropriate facial expression parameters, as a "non-thoughtful" facial expression, for instance by defining a parameter describing the eyeball location (location of the pupil of the eye in relation to the eye opening). Hence, the upper pair of eyes has a straight eyeball position. The lower pair of eyes, on the other hand, don't have a straight eyeball position, but rather an eyeball position where the pupils are directed relatively far from the centre of the eye opening. This could be interpreted as a "thoughtful" facial expression, leading to a postponement of the speech endpoint detection.

Other examples of such "thoughtful" facial expressions, possible to define using suitable facial expression parameters that can be calculated based on captured facial imagery, include offsetting the mouth to either side or wrinkling of the eyebrows.

In particular, in some embodiments said "thoughtful" facial expression is detected based on any one or several of the following parameter sets:

A first parameter set defining the facial expression based on a detected eyeball position, detected in step 425.

A second parameter set defining the facial expression based on a detected lip openness, detected in step 424.

A third parameter set defining the facial expression based on a detected eyebrow configuration.

During an ongoing speech detection step, it may be so that the digital assistant 100, 200, in a step 410, detects the physical presence of a user, and based thereon detects the head location in step 411, such as for visual tracking of the current speaker, as described above.

However, it may also be the case that the digital assistant 100, 200 in step 410 is not able to detect the presence of a user, or of the current speaker. For instance, such detection may be a visual detection in the area 104a having limited angular coverage, and the current speaker may have moved out from the area 104a while speaking. In this case, it is preferred that the digital assistant 100, 200, having thus detected a physical non-presence of the current speaker, as a result of this detection stays in the speech sound detection step for a predetermined amount of time, after which the digital assistant 100, 200 ends the speech sound detection step in case neither a physical presence of the current speaker nor a speech sound associated with the current speaker has been detected during the predetermined amount of time. In particular, this behaviour is preferred in case the digital assistant 100, 200, in step 410 of the same speech detection step, first detects the presence of, and tracks, the current speaker, after which no such current speaker presence can be detected any longer. Once the current speaker is again visible as being present for the digital assistant 100, 200, the tracking of the current speaker may be continued in the way described above.

As mentioned above, the physical detection of the user in step 410 may be based on digital image analysis, for instance using conventional edge-detection and shape evaluation image analysis software configured to detect human-like shapes in an image. Another example is using a heat camera and distinguishing higher-temperature fields as being human bodies. However, other detection methods are also possible, such as using a distance-detecting technique such as using a radar or a LIDAR, that are both conventional as such and will not be described in detail herein.

In the latter case, the current speaker tracking step 420 may comprise or use a position of the user 110, 120, 130; 210 determined by the digital assistant 100, 200 in step 418 to in turn determine a physical distance to, or a physical location of, the current speaker, which distance or location is measured in relation to a predetermined item, such as the predetermined object 101, 201, the reading sensor or a predetermined part of the digital assistant 100, 200. Then, the response step 428 may comprise the digital assistant 100, 200 modifying a response sound volume based on said detected physical distance. For instance, in case the current speaker is relatively close to a loudspeaker used by the digital assistant to produce audio feedback to the user, the volume of such audio feedback in step 428 is turned down, and vice versa.

In some embodiments, the present invention relates to a method for voice-based communication using a digital assistant, wherein the method comprises
an attention detection step, in which the digital assistant detects a user attention and as a result is set into a listening mode;
a subsequent speech detection step, in which the digital assistant detects and records speech uttered by said user;
a subsequent endpoint detection step, in which the digital assistant detects an endpoint of said speech and as a result exits said listening mode;
a speech analysis step, in which the digital assistant parses said recorded speech and extracts speech-based verbal informational content from said recorded speech; and
a subsequent response step, in which the digital assistant provides feedback to the user based on said recorded speech, wherein the attention detection step further comprises
a gaze detection step, in which the digital assistant detects a current gaze of the user and determines that said gaze is directed towards a predetermined physical entity, within a predetermined gaze direction margin; and
a head posture detection step, in which the digital assistant detects a current head posture of the user and determines that a face of the user faces towards said predetermined physical entity, within a predetermined head posture margin, at the same time as said gaze is directed towards the predetermined physical entity.

In some embodiments, the present invention relates to a method for voice-based interactive communication using a digital assistant, wherein the method comprises
an attention detection step, in which the digital assistant detects a user attention and as a result is set into a listening mode;
a subsequent speech detection step, in which the digital assistant detects and records speech uttered by said user;
a subsequent endpoint detection step, in which the digital assistant detects an endpoint of said speech and as a result exits said listening mode;
a speech analysis step, in which the digital assistant parses said recorded speech and extracts speech-based verbal informational content from said recorded speech; and
a subsequent response step, in which the digital assistant provides feedback to the user based on said recorded speech, wherein the endpoint detection step further comprises
a user depiction step, in which a face of the user is depicted and stored as a digital image;
a facial expression detection step, in which a facial expression of the user is detected based on a set of predetermined parameters, which facial expression is indicative of the user not having finished speaking; and
as a result of said facial expression detection, postponing the endpoint detection despite no speech currently being detected.

Furthermore, the present invention relates to the digital assistant 100, 200 as such, being arranged for voice-based interactive communication with a user 110, 120, 130; 210.

In general, such a digital assistant 100, 200 is implemented in a suitable combination of hardware and software. For instance, the digital assistant 100, 200 may comprise a general-purpose programmable CPU (Central Processing Unit), a RAM (Random Access Memory) and a communication bus, and being arranged to execute, on said CPU, specific software in turn being arranged to, when executed on said CPU, perform a method according to the present invention. The execution of such software may also be performed on a remote CPU, such as using a cloud computing resource over the internet, or a combination a locally arranged CPU and a remote CPU. There may also, of course, be several local and/or remote CPUs on which the specific software is caused to execute.

In particular, such a digital assistant 100, 200 is arranged to detect a user attention and as a result be set into a listening mode; to detect the user 110, 210 as a current speaker; to detect and record speech uttered by said current speaker; to detect a lip movement of the current speaker while detecting said speech; to parse said recorded speech and extract speech-based verbal informational content from said recorded speech; and to thereafter provide feedback to the user 110, 210 based on said recorded speech, all of which as has been described in detail above.

Furthermore, the present invention relates to computer software product specifically arranged to, when executed on one or several CPUs as described above, cause a digital assistant 100, 200 of the present type to perform the herein-described attention detection, speaker detection, speech sound detection, lip movement detection, speech analysis, response steps, to this way provide voice-based interactive communication to the user 110, 120, 130; 210, all of which as described above. It is realized that such computer software product may be the specific software mentioned above.

Above, preferred embodiments have been described. However, it is apparent to the skilled person that many modifications can be made to the disclosed embodiments without departing from the basic idea of the invention.

For instance, the digital assistant 100, 200 may comprise and/or be connected to various external databases and search tools, such as via the internet, to be able to search, analyse and concatenate relevant information to provide in a response to a query or statement uttered by the user.

In general, everything which has been said about the method is equally applicable also to the digital assistant and to the computer software product.

Hence, the invention is not limited to the described embodiments, but can be varied within the scope of the enclosed claims.

The invention claimed is:

1. A method for voice-based interactive communication using a digital assistant, the method comprising:
    an attention detection step, in which the digital assistant detects attention of the user by:
        detecting a gaze of a user;
        determining that the gaze is directed towards a physical or virtual object, wherein the physical or virtual object is different from the digital assistant; and
        in response to determining that the gaze is directed towards the physical or virtual object, activating a listening mode of the digital assistant;
    a speaker detection step, in which the digital assistant, during the listening mode, detects the user as a current speaker;
    a speech sound detection step, in which the digital assistant detects and records speech uttered by the current speaker, which speech sound detection step further comprises a lip movement detection step, in which the digital assistant detects a lip movement of the current speaker;
    an endpoint detection step after the speech sound detection step, in which the digital assistant detects an endpoint of said speech and as a result exits said listening mode, wherein the endpoint detection step further comprises:

a user depiction step, in which a face of the user is depicted and stored as a digital image;
a facial expression detection step, wherein the facial expression detection step includes detecting, based on a set of predetermined parameters, a facial expression that is indicative of the user not having finished speaking; and
as a result of said facial expression detection, postponing the endpoint detection despite no speech currently being detected;
a speech analysis step, in which the digital assistant parses said recorded speech and extracts speech-based verbal informational content from said recorded speech; and
a subsequent response step, in which the digital assistant provides feedback to the user based on said recorded speech.

2. The method according to claim 1, wherein the method further comprises a current speaker tracking step, in which the digital assistant tracks the current speaker using visual and/or voice tracking of the current speaker.

3. The method according to claim 2, wherein the current speaker tracking step comprises the digital assistant determining a physical distance to the current speaker, and wherein the response step comprises the digital assistant modifying a response sound volume based on said physical distance.

4. The method according to claim 1, further comprising a lip movement synchronisation step, wherein lip movement synchronisation step includes the digital assistant determining that a temporal correlation between detected lip movement and detected speech sound is within a predetermined tolerance threshold.

5. The method according to claim 4, wherein the method further comprises:
a lip movement interpretation step, in which the digital assistant interprets a lip-based verbal informational content corresponding to said detected lip movement, wherein, in the lip movement synchronisation step, the digital assistant temporally correlates said speech-based verbal informational content to said lip-based verbal informational content; and wherein the method further comprises
a speech parsing step, in which the digital assistant uses said lip-based verbal informational content to parse said speech-based verbal informational content.

6. The method according to claim 5, wherein said speech parsing step comprises the digital assistant purging detected speech sound and/or extracted speech-based verbal informational content not corresponding to detected lip movement.

7. The method according to claim 6, wherein the method further comprises providing to the digital assistant a predetermined attention phrase, and wherein said speech parsing step comprises the digital assistant purging extracted speech-based verbal information content starting with said attention phrase uttered by a different person than the current speaker.

8. The method according to claim 1, wherein the speaker detection step comprises temporally correlating detected lip movements of the user to detected speech and detecting the user as the current speaker based on said temporal correlation.

9. The method according to claim 1, wherein the method further comprises:
a speaker identification step comprising a visual user authentication step and/or a voice sound characteristics based user authentication step.

10. The method according to claim 9, wherein the method further comprises
a subsequent follow-up interaction step, in which additional speech is detected and analysed and in which the digital assistant provides feedback to the user based on said additional speech,
wherein, in said follow-up interaction step, the digital assistant maintains identification of the current speaker, and wherein, in said follow-up interaction step, a follow-up feedback provided to the current speaker preferably is determined based in part on a facial expression detected for the current speaker using a visual depiction of the current speaker and image analysis.

11. The method according to claim 1, wherein the attention detection step further comprises a head posture detection step, in which the digital assistant, as a necessary condition for detecting said attention of the user, additionally detects a current head posture of the user and determines that a face of the user faces towards a predetermined object, within a predetermined head posture margin.

12. The method according to claim 11, wherein the method further comprises providing to the digital assistant a predetermined attention phrase, and wherein the attention detection step comprises the digital assistant detecting a user attention based on said gaze detection step together with said head posture detection step but in absence of a detection of said predetermined attention phrase.

13. The method according to claim 1, wherein the speech analysis step comprises the digital assistant detecting a current head posture or head posture change and updates an endpoint detection parameter used in the detection of said endpoint in said endpoint detection step.

14. The method according to claim 13, wherein the speech analysis step further comprises the digital assistant detecting that the current speaker either turns its face away from a predetermined object or has its face turned away from the predetermined object during at least a predetermined time period, and interprets this event as an endpoint.

15. The method according to claim 1,
wherein the facial expression is detected based on:
a first parameter set defining the facial expression based on a detected eyeball position;
a second parameter set defining the facial expression based on a detected lip openness; and
a third parameter set defining the facial expression based on a detected eyebrow configuration.

16. The method according to claim 1, wherein the speech sound detection step comprises the digital assistant detecting a physical non-presence of the current speaker and as a result stays in the speech sound detection step for a predetermined amount of time, after which the digital assistant ends the speech sound detection step in case neither a physical presence of the current speaker nor a speech sound associated with the current speaker has been detected.

17. A digital assistant arranged for voice-based interactive communication, wherein the digital assistant is configured to:
detect a user attention and as a result be set into a listening mode, wherein the digital assistant is further configured to:
detect a gaze of the user;
determine that the gaze is directed towards a physical or virtual object, wherein the physical or virtual object is different from the digital assistant; and
in response to determining that the gaze is directed towards the physical or virtual object, activate the listening mode of the digital assistant;

detect, during the listening mode, the user as a current speaker;

detect and record speech uttered by said current speaker;

detect a lip movement of the current speaker while detecting said speech;

detect an endpoint after the speech sound detection step, in which the digital assistant detects an endpoint of said speech and as a result exits said listening mode, wherein the endpoint detection step further comprises:

a user depiction step, in which a face of the user is depicted and stored as a digital image;

a facial expression detection step, wherein the facial expression detection step includes detecting, based on a set of predetermined parameters, a facial expression that is indicative of the user not having finished speaking; and as a result of said facial expression detection, postponing the endpoint detection despite no speech currently being detected;

parse said recorded speech and extract speech-based verbal informational content from said recorded speech; and thereafter provide feedback to the user based on said recorded speech.

18. A non-transitory computer program product configured to, when executed on one or more processors, cause a digital assistant to perform operations comprising:

an attention detection step, in which the digital assistant detects attention of a user by:

detecting a gaze of a user;

determining that the gaze is directed towards a physical or virtual object, wherein the physical or virtual object is different from the digital assistant; and in response to determining that the gaze is directed towards the physical or virtual object, activating a listening mode of the digital assistant;

a speaker detection step, in which the digital assistant is caused to detect the user as a current speaker;

a speech sound detection step, in which the digital assistant is caused to detect and to record speech uttered by said current speaker, which speech sound detection step comprises a lip movement detection step, in which the digital assistant is caused to detect a lip movement of the current speaker;

an endpoint detection step after the speech sound detection step, in which the digital assistant detects an endpoint of said speech and as a result exits said listening mode, wherein the endpoint detection step further comprises:

a user depiction step, in which a face of the user is depicted and stored as a digital image;

a facial expression detection step, wherein the facial expression detection step includes detecting, based on a set of predetermined parameters, a facial expression that is indicative of the user not having finished speaking; and as a result of said facial expression detection, postponing the endpoint detection despite no speech currently being detected;

a speech analysis step, in which the digital assistant is caused to parse said recorded speech and to extract speech-based verbal informational content from said recorded speech; and a subsequent response step, in which the digital assistant is caused to provide feedback to the user based on said recorded speech.

* * * * *